(12) United States Patent
Nordhoff (10) Patent No.: US 7,353,885 B2
(45) Date of Patent: Apr. 8, 2008

(54) APPARATUS FOR COUPLING AN IMPLEMENT TO A WORKING VEHICLE

(75) Inventor: Hendrik Nordhoff, Havixbeck (DE)

(73) Assignee: Deere & Company, Moline, IL (US)

( * ) Notice: Subject to any disclaimer, the term of this patent is extended or adjusted under 35 U.S.C. 154(b) by 471 days.

(21) Appl. No.: 10/919,769

(22) Filed: Aug. 17, 2004

(65) Prior Publication Data
US 2005/0056438 A1   Mar. 17, 2005

(30) Foreign Application Priority Data
Sep. 13, 2003   (DE) ................ 103 42 403

(51) Int. Cl.
*A01B 51/00* (2006.01)
(52) U.S. Cl. .............. 172/272; 172/677; 172/439
(58) Field of Classification Search .......... 172/439, 172/450, 272, 677, 680, 444, 445.2; 280/186; 37/231
See application file for complete search history.

(56) References Cited

U.S. PATENT DOCUMENTS

| | | | |
|---|---|---|---|
| 2,609,742 A * | 9/1952 | Love .................... | 172/447 |
| 3,140,103 A | 7/1964 | Virtue et al. | |
| 3,432,184 A | 3/1969 | Tweedy .................. | 280/479 |
| 4,116,283 A | 9/1978 | Blessent | |
| 4,176,727 A | 12/1979 | Perin | |
| 4,194,756 A * | 3/1980 | van der Lely .......... | 172/439 |
| 4,519,623 A * | 5/1985 | Orthman ................ | 172/439 |
| 4,858,698 A * | 8/1989 | Williamson et al. ..... | 172/448 |
| 5,346,018 A * | 9/1994 | Koster ................. | 172/47 |
| 5,697,454 A * | 12/1997 | Wilcox et al. .......... | 172/447 |
| 5,727,803 A | 3/1998 | Johnson | |
| 5,997,024 A * | 12/1999 | Cowley ................. | 280/478.1 |

(Continued)

FOREIGN PATENT DOCUMENTS

DE           31 28561 A1        1/1983

(Continued)

OTHER PUBLICATIONS

"Kinematik und Robotik" von Manfred Husty et al, Springer-Verlag Berlin Heidelberg New York (1997), pp. 491-524, ISBN 3-540-63181.

*Primary Examiner*—Thomas B. Will
*Assistant Examiner*—Jamie L McGowan (57) ABSTRACT

The present invention relates to an apparatus for coupling an implement to a working vehicle, having two lower link bars, a length-adjustable upper link bar, and two lifting elements. The end closest to the working vehicle, of each of the lower link bars and the upper link bar, is swingably mountable, and the other end closest to the implement is likewise swingably mountable. The upper link bar is essentially disposed centrally in the upper region of the coupling apparatus. The two lower link bars are disposed essentially laterally in the lower region of the coupling apparatus. One end of each of the lifting elements can be swingably mounted on a respective lower link bar. A supported load from the implement which acts on the working vehicle does not lead to diminishment of the load on a vehicle axle. For this purpose, the coupling apparatus is characterized in that the respective other ends of the lifting elements directed toward the implement, can be swingably mounted in essentially an upper region of the coupling apparatus.

25 Claims, 9 Drawing Sheets

U.S. PATENT DOCUMENTS 6,581,695 B2 * 6/2003 Bernhardt et al. .......... 172/439
6,688,403 B2 * 2/2004 Bernhardt et al. ............. 172/2
6,796,384 B1 * 9/2004 Potter .......................... 172/439
6,830,110 B2 * 12/2004 Schlesser et al. ............... 172/8
6,971,453 B2 * 12/2005 Nordhoff .................... 172/439
7,008,168 B2 * 3/2006 Bernhardt et al. .......... 414/703
7,073,603 B2 * 7/2006 Nordhoff .................... 172/272
7,100,704 B2 * 9/2006 Potter ......................... 172/439

FOREIGN PATENT DOCUMENTS

DE      41 38 483 A1    6/1992

* cited by examiner

APPARATUS FOR COUPLING AN IMPLEMENT TO A WORKING VEHICLE

FIELD OF THE INVENTION

The present invention relates to an apparatus for coupling an implement to a working vehicle, the apparatus comprising two lower link bars, a length-adjustable upper link bar, and two lifting elements. The one end of each of the lower link bars and the upper link bar closest to the working vehicle, is swingably mountable with respect to the vehicle, and the other end closest to the implement is likewise swingably mountable with respect to the implement. The upper link bar is essentially disposed centrally in the upper region of the coupling apparatus. The two lower link bars are disposed essentially laterally in the lower region of the coupling apparatus. One end of each of the lifting elements can be swingably mounted on a respective lower link bar.

BACKGROUND OF THE INVENTION

Devices of this type are commonly used for coupling an implement to an agricultural or industrial tractor, truck or other utility vehicle. The implement may generally be a machine which is towed or supported by the tractor. An example of a towed implement might be a plow or trailer. A supported implement might comprise, a sprayer for example. Particular implements which might be employed are plows, sowing machines, balers, and mowing machines. Various attachment interfaces (also called hitches) are known, for attaching an agricultural implement to an agricultural utility vehicle. Such a coupling apparatus is, for example a three-point hitch, as defined by German Standard DIN 9674 (or ISO 730).

The article "Mechatronics in Mobile Hydraulics" (in German) (2002 Landtechnik, 57, 3:140-141), discloses a hitch which is a refinement of the customary three-point hitch, wherein the lifting thrust elements and the upper link bar are in the form of length-adjustable elements.

If the upper link bar is switched into a pressureless state, a "tipping" movement between the implement and the working vehicle, around an axis which essentially passes through the articulation points on the side directed toward the implement, can be achieved. The axis of tipping is always disposed in or on the implement, as a consequence of the configurational design, in the customary hitches. This means that the tipping axis is far from an axle of the working vehicle, in particular far from the rear axis of the working vehicle. As a result, a supported load from the implement acting on the working vehicle is transmitted to the working vehicle via a moment arm which extends from the working vehicle axle (e.g. the rear working vehicle axle) to the tipping axis. This is disadvantageous from the standpoint of force transmission, particularly transmission of supported loads from the implement to the working vehicle, because it diminishes the load on the other axle of the working vehicle (e.g. the front axle). This load reduction needs to be compensated for by a counterweight. Such an approach is costly and consumptive of resources, because different implements will exert different supported loads on the working vehicle, necessitating the positioning of different counterweights on the working vehicle in order to achieve optimum weight distribution between the axles of the working vehicle. This requirement is particularly burdensome for working vehicles in the form of agricultural tractors, because these generally require good contact between all of the wheels and the ground.

The term "tipping" in the context of the present invention refers to any movement around an essentially horizontally disposed axis which is essentially perpendicular to the longitudinal axis of the hitch, when the equipment is in operating position.

The underlying problem of the present invention is deemed to be to devise an apparatus for coupling an implement to a working vehicle, the apparatus being of the general type described hereinabove, with improvements such that the above-described drawbacks are overcome. In particular, the system should not be such that a supported load from the implement acting on the working vehicle will unavoidably diminish the load on one of the axles of the working vehicle.

SUMMARY OF THE INVENTION

According to the invention, an apparatus for coupling an implement to a working vehicle, the apparatus being of the general type described hereinabove, is characterized in that the respective ends of the lifting elements, directed toward the implement, can be swingably mounted in essentially an upper region of the coupling apparatus. Thus one end of the lifting elements is mounted to the lower link bars and the other end is mounted at the side directed toward the implement.

By means of the orientation of the lifting elements, which orientation differs from that of the state of the art, the tipping axis between the implement and the working vehicle is no longer disposed closer to the implement, but it can be shifted toward the working vehicle. As a result there is essentially no longer a moment arm with respect to the working vehicle; this is in contrast to the customary situation with three-point attached or towed implements. Accordingly, a supported load of the implement acts directly on the tipping axis, which is located on or in the working vehicle, so that the supported load is borne essentially directly by the working vehicle—preferably by the rear axle of the vehicle, near which ordinarily the coupling apparatus is located—and this occurs without appreciable shifting of load to or from the other axis of the working vehicle. A major advantage of this is that it obviates the shifting and exchanging of counterweights when one couples a different implement, with a different supported load, to the working vehicle. With three-point devices such as customary three-point hitches, the rotational axis for an implement which is self-supporting and is driven in a so-called floating position can be shifted from the instantaneous center of rotation to the articulation points of the lower link bars. In this context, the "instantaneous center of rotation" is understood to mean the intersection point of the lines of effect of the lower link bars and the upper link bar. The configuration leads to improved adjustment to the ground, because the rotational axis of the lower link bars is closer to the rear axis of the tractor than is the instantaneous center of rotation. Thus, changes in the angle between the tractor and the implement do not have as much effect on the working depth of the implement. In addition, more supported load is transmitted to the tractor, because the rotational axis of the lower link bars is not as far from a supporting roll or a wheel axle of the implement as is the instantaneous center of rotation.

Further, as a result of the fact that the tipping axis is located close to the working vehicle i.e. close to the rear axle of the working vehicle, the influence of oscillatory impulses which arise during operation, between the working vehicle and the implement, is reduced or minimized, thereby leading to greatly improved driver comfort. Finally, the configuration has two lower link bars, an upper link bar, and two lifting thrust elements, which is comparable to a customary three-point hitch configuration, but with this configuration the effective articulation points of the two lower link bars, the upper link bar, and the two lifting thrust elements are disposed on the side directed toward the implement rather than on the side directed toward the working vehicle.

In a preferred embodiment, the lifting elements can be swingably mounted in essentially the forward or central region of the respective lower link bars. In this way, advantageously, structural design problems can be avoided, if for example the lifting elements are not swingably mounted near to the ends of the lower link bars which ends are directed toward the working vehicle, because if that were the case the lifting elements could come to strike against a part of the housing of the working vehicle.

It is possible to mount the lifting elements via a lever arm structure in the direction toward the implement. With this configuration, an arrangement for raising and lowering the lower link bars could be employed which is in the nature of arrangements currently used, but it would be disposed in the direction toward the implement rather than in the direction toward the working vehicle. The lever arm construction could have length-adjustable lifting cylinders, with the aid of which the lifting elements could be raised or lowered via the lever arm construction. Because the lifting cylinders of the lever arm construction are disposed on the implement, appropriate actuating lines must be provided, e.g. in the form of hydraulic fluid lines, which adapt to the working vehicle via, e.g., a quick coupling.

In a particularly preferred embodiment, the lifting elements are length-adjustable. In this way, a lever arm construction with lines and quick couplings is unneeded. The lifting elements may be in the form of, e.g., hydraulically controllable double-acting cylinders. Length-adjustable lifting elements allow direct and immediate raising or lowering of a towed implement.

The lower link bars, the upper link bar, and the lifting elements, can be attached directly to an implement. In a preferred embodiment, however, they are mounted to a coupling frame on the side directed toward the implement, so that articulations at the ends of these elements directed toward the implement are disposed at the coupling frame. The ends of these elements directed toward the working vehicle are swingably mounted with respect to the working vehicle. If in a particular operating mode the lengths of these elements are held constant, there results a firm connection between the working vehicle and the implement.

For simple coupling of an implement to the working vehicle, the coupling frame might have an adapter interface for an implement. The coupling frame might, for example, be in the form of a quick coupling frame (so-called "quick coupler").

Preferably, the adapter interface comprises coupling means for attachment of the implement. These coupling means may, for example, comprise three upwardly open hooks which engage a corresponding implement interface of the customary type.

Preferably the ends of the lower link bars and the upper link bar which ends are directed toward the working vehicle are mounted directly on the housing of the working vehicle. The "housing" here might be an axle housing or the housing of a transmission mechanism (such as a differential), of a working vehicle. In a working vehicle in the form of a customary tractor, the lower link bars and the upper link bar may be attached to the mounting means for the customarily employed three-point hitch; thus no structural changes need be made to the tractor itself. Alternatively, the lower link bars and the upper link bar might be mounted to a frame structure which is disposed on the working vehicle, which frame structure may be removable, for example the frame structure for the coupling apparatus can be adapted to a customary three-point hitch arrangement. In this connection, it is possible for the apparatus to have a modular construction, advantageously adaptable to existing interfaces of, e.g., a tractor. Finally, in this way compatibility of the apparatus with a hitch described in German Standard DIN 9674 or ISO 730 may be provided.

In a particularly preferred embodiment, on the side directed toward the working vehicle, the lower link bars can be mounted close to a vehicle axle. In this way a supported load transmitted from an implement to the working vehicle acts almost directly on the vehicle axle, so that, advantageously, very high supported loads of an implement can be transmitted to the working vehicle.

In a particularly preferred embodiment, the upper link bar and possibly the lifting elements is/are controllable such that the distribution of the weight of the working vehicle and of the weight transmitted from the implement acting on the working vehicle, on the axles of the working vehicle, can be varied. Thus, a supported load from an implement, in the amount of about 300 kg, acting on the rear axis of a working vehicle, can be distributed, with the aid of an appropriate pressurization of the upper link bar (depending on the geometric disposition of the articulation points of the upper link bar and lower link bars, on the ends closer to the working vehicle, and the lever action associated therewith), such that 150 kg of the supported load acts on the front axle and 150 kg of the supported load acts on the rear axle, of the working vehicle.

In particular, a load acting on the working vehicle in essentially the vertical direction can be distributed essentially uniformly or in a prescribed ratio, over the axes of the working vehicle. This load may have a positive or negative value, depending on whether the force of the implement acting on the working vehicle is downwardly or upwardly directed. An upwardly directed force may arise, e.g., if the implement, such as a trailer, has a single axle with wheels, and the part of the implement which is directed away from the working vehicle with respect to this axle weighs more than the other part of the implement.

The two lower link bars may be rigid, in customary fashion. In a preferred embodiment, however, these lower link bars are length-adjustable. In this connection for example, the implement connected via the coupling apparatus may be oriented at 180 degrees—i.e. laterally offset with respect to the working vehicle, which enables numerous applications. This is particularly advantageous if a mower is connected to a tractor via the coupling apparatus, and the area to be traversed by the mower in the direction of travel is offset laterally from the area traversed by the tractor. Also, in a particularly advantageous manner, a curved path of the tractor and implement combination, particularly in turns, can be negotiated in an improved manner by means of length-adjustable lower link bars, e.g. to provide a smaller turning radius, in that hereby swinging travel between the working vehicle and the implement is possible, corresponding to a swinging movement. In this arrangement, each cylinder or cylinder pair has one degree of freedom associated with it, so that, in particularly advantageous fashion, without active control functions of all of the length-adjustable elements, the full functionality of an apparatus interface as intended by German Standard DIN 9674 or ISO 730 can be achieved.

In a particularly preferred embodiment, a length-adjustable transverse link element may be provided which cooperates with at least one of the two lower link bars, and which is directed at an angle to the longitudinal direction of the working vehicle. The transverse link element enables, in particular, realization of swinging movements between the working vehicle and the implement. In the context of the present invention, "swinging movements" mean relative movements between the working vehicle and the implement which in operating position occur in an essentially horizontal direction, such as occur, e.g., in a tractor-trailer combination comprised of a tractor and an implement if the combination executes a strongly wavy path (slalom course). Via the length-adjustable transverse link element, the degree of freedom of the swinging movement may be provided either passively or directly by means of controlling of the transverse link element. It is unnecessary to provide additional elements or actuators or means of control, in order to achieve controlled swinging movement in an advantageous fashion.

One end of the transverse link element may be swingably mounted to one lower link bar, and the other end of the transverse link element may be swingably mounted to the other lower link bar. With this arrangement the transverse link element may be said to be disposed between the two lower link bars, whereby advantageously the coupling apparatus can be constructed in a compact structure.

Alternatively, a length-adjustable transverse link element may be provided, one end of which is swingably linked with respect to the implement and the other end of which is swingably linked to one of the two lower link bars or with respect to the working vehicle. With these configurations of the transverse link element, a compact structure is also possible, because here, as well, the transverse link element is essentially disposed between the two lower link bars.

One end or both ends of the transverse link element can be disposed essentially at the same location as or immediately adjacent to respective articulation points of the lower link bars e.g. on the working vehicle the articulation point of the transverse link element may be co-located with the articulation point of a lower link bar, i.e. may be located at essentially the same point. On the implement, the other articulation point of the transverse link element may be co-located with the articulation point of the other lower link element. By the disposition of the ends of the transverse link element in immediate proximity to the lower link bars, a changing of the length of the transverse link element has an almost direct effect at the corresponding articulation points of the lower link bars. Under conditions of constant length of the transverse link element, such an arrangement can, in an advantageous manner, effectively inhibit an undesirable swinging movement.

In a preferred embodiment, the transverse link element and the two lower link bars are disposed such that a closed kinematic chain is formed by the three elements. This is a parallel structured arrangement the theoretical bases of which are discussed in Husty, Manfred; Karger, Adolf; Sachs, Hans; and Steinhilper, Waldemar, 1997, "Kinematics and Robotics" (in German), pub. Springer-Verlag (Berlin, Heidelberg, New York), pp. 491-524 (ISBN 3-540-63181). A closed kinematic chain is a drive comprised of members (legs) and articulations, wherein the end points of the chain are swingably linked to a common base body. In the present case, the length-adjustable lower link bars and the upper link bar represent the members of the kinematic chain, and the articulation points of these members are the articulations. A closed kinematic chain is particularly advantageous with respect to the degrees of freedom which it can provide.

In particular, if one end of each of the lifting elements engages the respective lower link bar, e.g. in the central region of the lower link bar, it is preferably provided that an end of the transverse link element swingably mounted to the lower link bar is co-located with an end of a corresponding lifting element which is swingably mounted to the lower link bar, or is disposed a slight distance therefrom. In this way, the lifting element and the transverse link element engage that lower link bar at the same location.

In general, it is possible for the two lower link bars and/or the lifting elements to be arranged in an essentially parallel disposition, a convergent disposition, or in a V-configuration. Preferably a convergent disposition of the lower link bars is provided which is configured in a manner which is customary for lower link bars of a three-point hitch. This provides a wider spacing of the articulation points of the lower link bars on the end directed toward the implement than on the end directed toward the working vehicle.

According to the invention, a length-adjustable element may have a cylinder which preferably is configured so as to be hydraulically controllable. In particular, the cylinder may be bi-directionally acting, wherewith the cylinder can exert (and can accommodate) thrust forces as well as tensile forces. Little additional expenditure of funds or resources is needed in order to provide a hydraulically controllable cylinder for a coupling apparatus and to adapt the same to a tractor, for example, because ordinarily a tractor already has the equipment to operate other hydraulically driven actuators, e.g. a hydraulic pump, lines, and connecting fittings.

In a particularly preferred embodiment, a length-adjustable element has a travel measurement system and/or a pressure sensor and/or a force sensor. A travel measurement system for the length-adjustable elements provides a control unit associated with the travel measurement system with constant monitoring of the relative position between the working vehicle and the implement, which may enable advantageous control of the coupling apparatus for various applications. If the length-adjustable elements are each provided with a pressure sensor and/or a force sensor, damping can be achieved between the working vehicle and the implement, which advantageously leads to driving comfort in the case of a tractor and a implement.

The coupling apparatus can be employed in very versatile fashion if at least one end of a lower link bar, an upper link bar, a lifting element, and/or a transverse link element has a pivotable coupling whereby relative movement in at least two degrees of freedom is possible. If each end of a lower link bar, an upper link bar, a lifting element, and/or the transverse link element has such a pivotable coupling, nearly unlimited relative positioning between the working vehicle and the implement is possible. In practice, the pivotable coupling may preferably comprise a universal joint or a ball joint.

In another preferred embodiment, the two lower link bars are length-adjustable. The length-adjustable lower link bars, the length-adjustable lifting elements, the length-adjustable upper link bar, and the length-adjustable transverse link element are controlled in such a manner that the spatial position, of an effective towing point of the implement, acting on the working vehicle, can be changed. The term "effective towing point acting on the working vehicle" should be understood to subsume, in particular, the intersection point of the imaginary extensions of the lower link bars and the upper link bar, of the coupling apparatus. As soon as the length of one of these three elements is adjusted, the location of the intersection point of the extensions is changed, as is the effective towing point (under the assumption here that in fact there is a common point of intersection of the extensions). If the transverse coupling plane closer to the implement is guided on a circular path around an effective towing point, in swinging out of the coupling apparatus, by controlling of the lengths of the length-adjustable elements, it is not inevitable that the effective towing point will lie at a point of intersection of the imaginary extensions of the lower link bars and the upper link bar. Rather, one may freely choose the position of the effective towing point. Ordinarily in a tractor-trailer combination comprised of a tractor and a implement, the effective towing point is located between the front axle and the rear axle of the tractor. The relative position of the effective towing point of the implement with respect to the working vehicle is particularly relevant to the transmission of forces from the implement to the working vehicle. By appropriate control of the length-adjustable elements, the effective towing point can be shifted, wherewith advantageously an optimal force transmission from the implement to the working vehicle can be achieved.

The effective towing point arises when the implement moves in a circle around a point, in relative movement to the working vehicle. If these circular paths are modified by appropriate control of the length-adjustable elements, the position of the effective towing point can be changed, independently of the geometric configuration. The position of the effective towing point can be changed essentially in a vertical and/or horizontal direction, by control of at least one length-adjustable element, such that the implement can be swung freely around the effective towing point in the vertical and/or horizontal plane, on a circular path which is variable by control of the length-adjustable elements. If the two movements are superimposed, the implement can be swung freely on a spherical path around the effective towing point, providing a particularly advantageous means of realizing numerous additional operating modes.

In a preferred embodiment, a "floating position" and/or a swinging movement between the working vehicle and the implement is achievable by switching into a pressureless state at least one individual length-adjustable element. One has a "floating position" during operation particularly when a towed implement generally adjusts its vertical movement to an unevenness in the ground (or other substrate). In general, an ordinary three-point hitch permits only limited swinging movement between the working vehicle and the implement, because the lower link bars and the upper link bar can be swung only within a limited range allowing swinging movement between the working vehicle and the implement.

If, according to the invention, the length-adjustable transverse link element is switched to a pressureless state a lateral swinging movement between the working vehicle and the implement is achievable. The term "pressureless" should be understood to mean (in the example of a hydraulic cylinder) that a piston can move freely, and the cylinder chambers can be connected with the sump.

The upper link bar can also be switched to a pressureless state, which enables a "tipping" movement between the working vehicle and the implement, around a horizontal axis. This is particularly possible if the implement is a towed apparatus.

One can realize the bearing of supported loads and/or a rotation around the longitudinal axis of the working vehicle, by means of switching to a pressureless state and/or suitable connection of the hydraulic chambers, of the lifting elements. One can also realize rotation of the implement relative to the working vehicle around the longitudinal axis of the working vehicle by active control of the lifting elements.

In practice, at least one connecting line may be provided whereby the cylinder chambers of at least two cylinders can be interconnected. Such a connection line may preferably comprise a direct connection between at least two cylinders. Whereas the provision of such a connection line entails costs, nonetheless the result may be overall simplification of the configuration of the valves needed for controlling the aggregate of length-adjustable elements, thus with some offsetting savings.

The connecting line may comprise at least one valve whereby a connection between the cylinder chambers of the cylinders can be provided or interrupted. In the simplest case, the two cylinder chambers of a cylinder are interconnected with the two cylinder chambers of a second cylinder, by means of two respective connecting lines. The two connecting lines may have a 4/2-way valve which in the first position interrupts both of the connecting lines, and in the second position joins both of the connecting lines together in fluid communication. In this way, in particularly advantageous fashion, a connection of the individual cylinder chambers of the cylinders is achieved, without requiring a costly and complex complete hydraulic control of the length-adjustable elements.

Particularly preferred is an arrangement whereby, by active control of individual length-adjustable elements, an adjustable relative positioning between the working vehicle and the implement is achievable, which positioning is adjusted to the given operating mode of the working vehicle and implement. Finally, all length-adjustable elements may be actively controlled, in order to realize a special relative positioning between the working vehicle and the implement. This may comprise, e.g., lateral displacement of an area traversed by a mower in the direction of travel, the displacement (offset) being with respect to an area traversed by the tractor.

Additional examples of functional possibilities and/or advantageous characteristics of the coupling apparatus are:
 Damping of excitation frequencies and force impacts, particularly including situations with towed implements;
 Controlled shifting of the weight of the implement to the working vehicle;
 Compensation for drift, when working on a slope;
 Compensation for ground irregularities (inclines or bending), and damping of effects of, e.g., potholes in the ground;
 Improvement of stability of the driving behavior of the implement and the working vehicle, by pre-stressing of the coupling apparatus.

Particularly for towed implements, it is advantageous to have transmission of forces in the working vehicle which transmission is essentially realized only by the articulation points of the lower link bars directed toward the working vehicle, which articulation points are close to the longitudinal axis of the working vehicle. The length-adjustable upper link bar can dampen transients in one degree of freedom around the transverse axis of the working vehicle regarding "tipping" movements between the working vehicle and the implement, whereby power-hop can be avoided. Additionally, by means of the length-adjustable upper link bar the distribution of load to the axles of the working vehicle can be influenced. As a result of the rotational point being disposed substantially behind the working vehicle, a large turning angle between the working vehicle and the implement can be realized.

In addition, regulation adjusted to the given situation can be achieved, whereby, e.g., when the tractor-trailer combination is turned at the end of a field, it is unnecessary to lift the implement, and nonetheless a small turning radius can be achieved. Another example relates to regulation of the height of an implement such as a plow.

The coupling apparatus realizes, in a particularly advantageous manner, in addition to the functions of an ordinary three-point hitch, all rotational degrees of freedom around the x, y, and z axes. Thus, in particular, one can now realize:

parallel lifting of an implement;

management of the bending angle of a power takeoff shaft; and, increased lifting force.

It should be noted that, because of the configuration of the length-adjustable elements, a certain desirable degree of freedom of relative movement between the working vehicle and the implement is achieved, in a particularly advantageous manner; i.e., control of a single length-adjustable element results in control of an associated degree of freedom. In this way, the control of the length-adjustable elements is substantially simplified, which ultimately reduces the entire cost of production of the coupling apparatus.

In another embodiment, a rotational movement between the working vehicle and the implement is achievable by coupling of the two length-adjustable lower link bars. The term "coupling" here is intended to mean particularly a crossed interconnection of the cylinder chambers, resulting in opposite piston movement in the two cylinders. With such a coupling of the two length-adjustable lower link bars, one can advantageously realize movement along a very tight curve (turning radius) compared to the known art, in that the amount of shortening of one of the lower link bars is the same as the amount of lengthening of the other lower link bar. The same principle makes it possible to realize a degree of freedom around the longitudinal axis of the tractor, by means of the two lifting elements, and at the same time to advantageously bear the supported loads applied from the implement.

Also, the cylinder chambers of the lifting elements can be connected to the cylinder chambers of the upper link bar. In this manner, the load on the forward axis of the working vehicle can be regulated depending on the supported load of the implement. Additionally, the effect of this hydraulic circuit which assists the driving dynamics is further supported by switching-in a spring-and-dashpot element.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
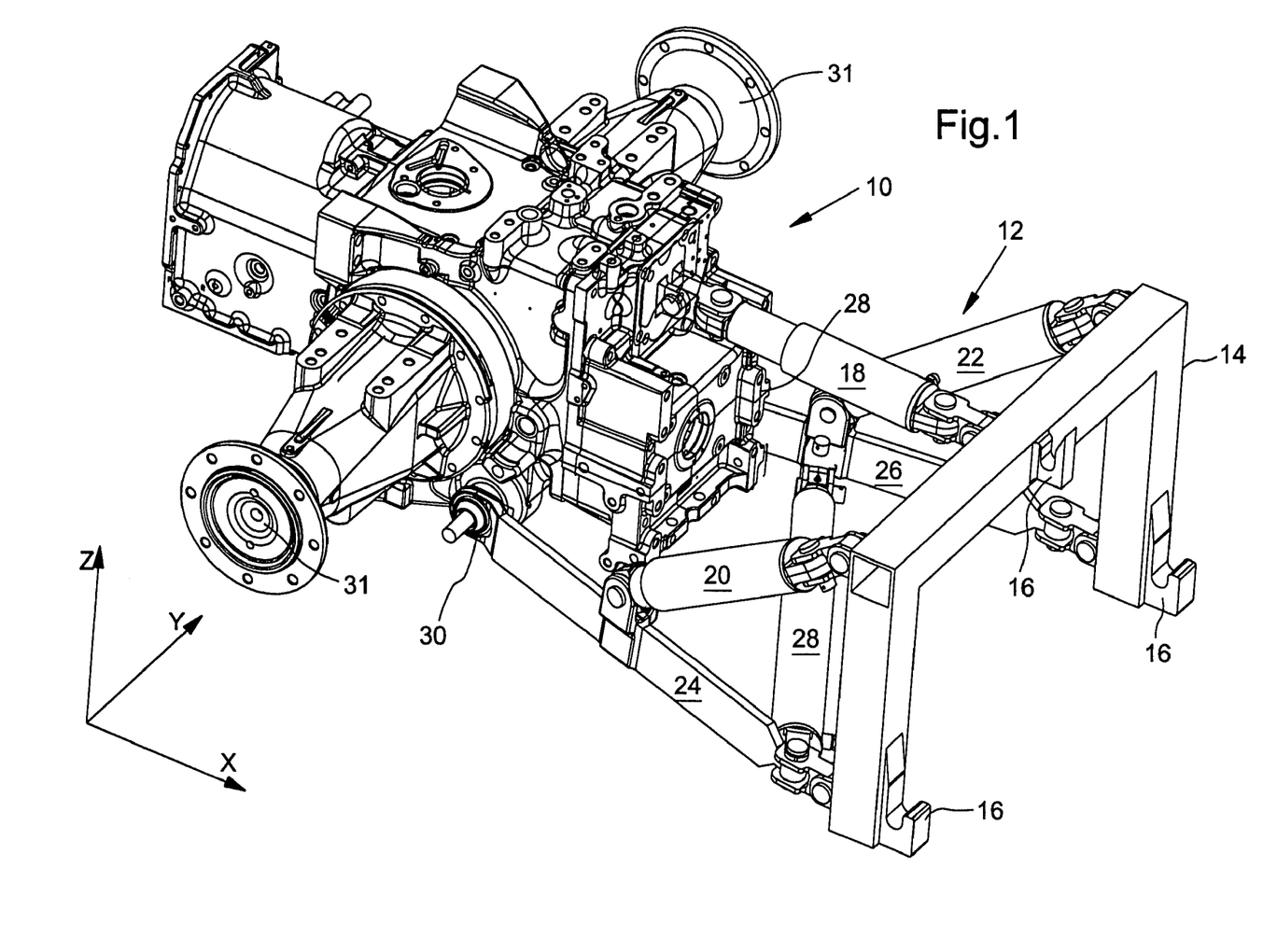
FIG. 1 is a representation of a first exemplary embodiment of the invention, in a perspective three-dimensional view.
Figure 2:
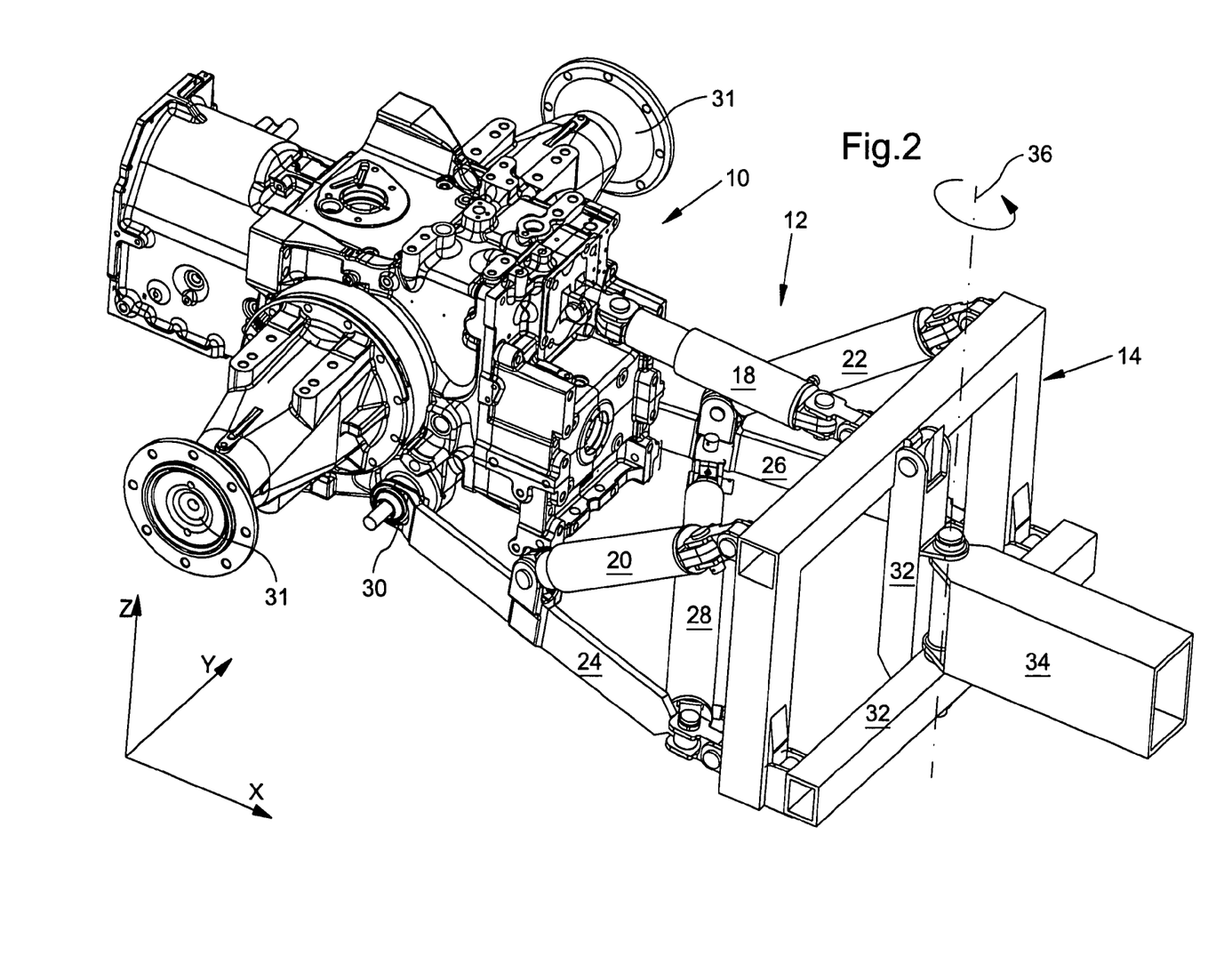
FIG. 2 is a representation of the exemplary embodiment of FIG. 1, wherein the coupling frame on the side nearest to the implement is configured differently from that in FIG. 1.

In the figures, similar or analogous component parts have been labeled with like reference numerals. In FIGS. 1 and 2, an axle housing 10 of a working vehicle (not further illustrated) is shown, to which a coupling apparatus 12 is adapted. The axle housing 10 shown in FIGS. 1 and 2 is a part of a tractor. An implement (also not illustrated in FIG. 1) is adapted to be connected to the tractor via the coupling apparatus 12. The implement is adapted to, inter alia, the coupling frame 14 via coupling means 16 which are in the form of upwardly open hooks. The three-point functionality of a customary three-point hitch is provided by the coupling frame 14 with its coupling means 16. The coupling frame 14 via its configuration with the coupling means 16 serves as an adapting interface for an implement.

The coupling apparatus 12 comprises a length-adjustable upper link bar 18, two lifting elements 20, 22, and two lower link bars 24, 26. The upper link bar 18 enables, inter alia, the execution of "tipping" movements between the working vehicle and the implement. The two lower link bars 24, 26 serve most importantly for bearing of tensile or thrust forces. The two lifting elements 20, 22 serve principally for performing of lifting movements. The upper link bar 18 and the two lower link bars 24, 26 are swingably mountable, with their respective "first ends", on the part of the coupling apparatus 12 directed toward the working vehicle 10. The other ends of the upper link bar 18 and the lower link bars 24, 26 are swingably mountable to the coupling frame 14.

The upper link bar 18 is disposed centrally in the upper region of the coupling apparatus 12. The two lower link bars 24, 26 are disposed respectively laterally in the lower region of the coupling apparatus 12. The lifting elements 20, 22 are swingably mountable, at one end, in the respective central regions of the lower link bars 24, 26.

In the coupling apparatus 12 the other ends of the lifting elements 20, 22, on the implement side, are swingably mountable in the upper region of the coupling apparatus 12, namely (in the exemplary embodiments according to FIGS. 1 and 2) they are mountable to the upper region of the coupling frame 14.

The forward articulation points 30 of the lower link bars 24, 26 are disposed close to the rear drive axle 31 of the tractor, namely in the axle housing 10 of the working vehicle. Particularly in the transfer of supported loads of the implement to the working vehicle, this results in almost no lever effect, so that advantageously there is no diminishment of the load on the front axle of the implement as a result of the supported load acting on the working vehicle.

A length-adjustable transverse link element 28 is provided which cooperates with the lower link bar 26. The transverse link element 28 has one end swingably connected to a central region of the lower link bar 26, and has its other end swingably connected to the coupling frame 14, namely at the location where the lower link bar 24 is swingably connected. Thus a tensile or thrust force transmitted by the transverse link element 28, on the side directed toward the implement, acts at approximately the same location of the coupling frame 14 as, e.g., a tensile force transmitted from the lower link bar 24 to the implement. With the transverse link element 28, a lateral swinging movement between the working vehicle and the implement can be achieved and controlled.

The end of the transverse link element 28 which is swingably connected to the lower link bar 26 has its articulation point disposed a slight distance from the articulation point of the lifting element 22 on the lower link element 26. The lifting elements 20, 22 are attached to the lower link bars 24, 26 in the respective central regions of the latter. The lifting elements 20, 22 are length-adjustable.

Thus, the coupling apparatus 12 realizes passive degrees of freedom around the y-axis of the coordinate system indicated in FIG. 1, which degrees of freedom are exercisable in that the length-adjustable upper link bar 18 can be controlled and can also be switched into a pressureless state. This relates to mutual tilting movements between the working vehicle and the implement. By appropriately controlling the lifting elements 20, 22 it is possible to achieve a passive rotation of the implement with respect to the working vehicle around the x-axis, thereby advantageously providing the coupling apparatus 12 with a degree of freedom in this regard. The x-axis indicated in FIG. 1 is parallel to the longitudinal axis of the coupling apparatus 12 and the longitudinal axis of the working vehicle.

The two lower link bars 24, 26, and the lifting elements 20, 22 as well, are disposed in a slightly converging orientation, wherewith the ends of the lower link bars 24, 26 directed toward the working vehicle are disposed closer together than the ends of the lower link bars 24, 26 which are directed toward the coupling frame 14. The convergence point of the lower link bars 24, 26 is approximately at the center of the tractor.

FIG. 2 shows a modification of the exemplary embodiment of FIG. 1, wherein an implement is coupled to the coupling frame 14. The implement is in the form of a towed trailer; only the part of the implement which immediately adjoins the coupling frame 14 is shown in FIG. 2. This part comprises a frame 32 which is suspended and fixed in the coupling means 16 of the coupling frame 14. The part of the frame 32 closest to the working vehicle is fixed to the tow shaft 34 of the trailer such that the tow shaft 34 can swing around the axis 36; in operating position the axis 36 is oriented vertically (parallel to the z-axis). Thus a degree of freedom consisting of relative movement between the working vehicle and implement around the z-axis, passively as regards the implement, is provided.

The articulations provided at the articulation points of the lower link bars 24, 26, the upper link bar 18, and the lifting elements 20, 22, in FIGS. 1 and 2, are each swingable couplings allowing relative movement in at least two degrees of freedom. In practice, such a swingable coupling is provided in the form of a universal joint or ball joint. In FIGS. 1 and 2 the articulation points of the lower link bars 24, 26 closest to the working vehicle have three rotational degrees of freedom.

Figure 3:
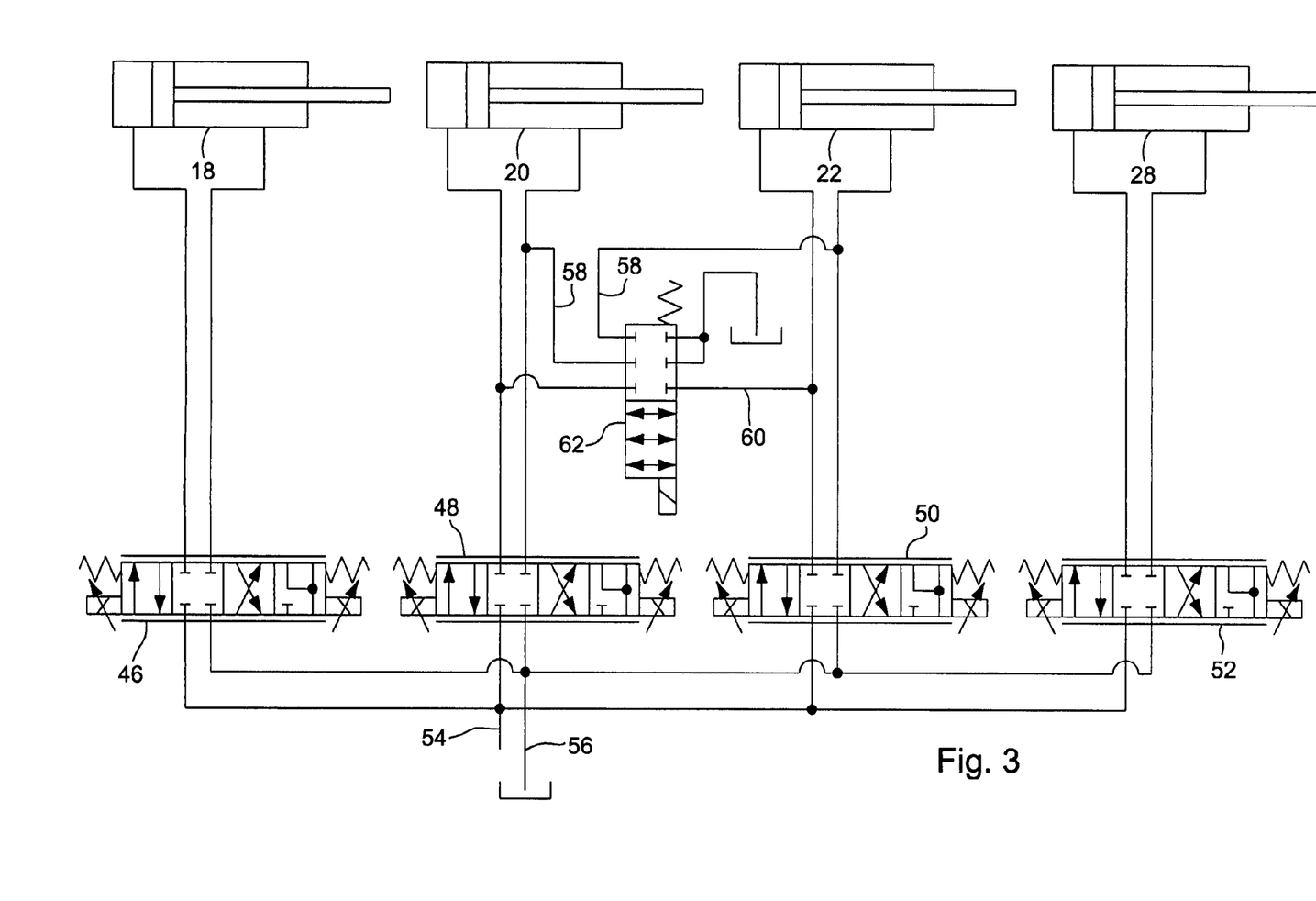
FIG. 3 is a schematic representation of a first exemplary embodiment of a hydraulic circuit for control of four length-adjustable elements of a coupling apparatus.
Figure 4:
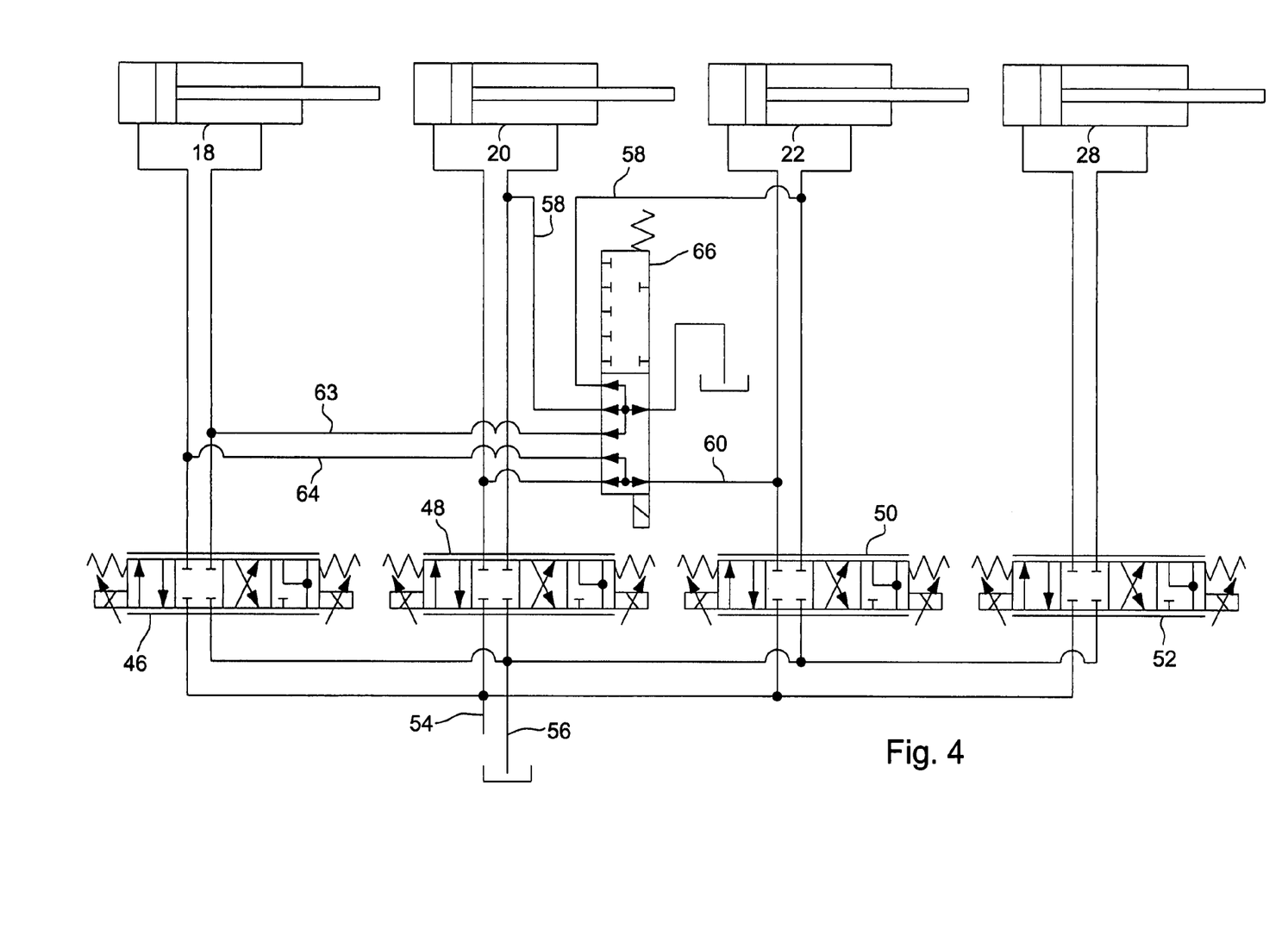
FIG. 4 is a schematic representation of a second exemplary embodiment of a hydraulic circuit for control of four length-adjustable elements of a coupling apparatus.

FIGS. 3 and 4 show, schematically, two respective hydraulic circuits according to which the length-adjustable upper link bar 18, the length-adjustable lifting elements 20, 22, and the transverse link element 28 are controlled. The length-adjustable elements 18, 20, 22, and 28, corresponding to the length-adjustable elements shown in FIGS. 1 and 2, are in the form of hydraulic cylinders which are double-acting.

FIG. 3 shows a rigid operating state of the length-adjustable elements 18, 20, 22, and 28, in that—as a result of the illustrated positions of the four 4/4-way valves 46, 48, 50, 52—the pressure line 54 and the sump line 56 have no connection to the length-adjustable elements 18, 20, 22, and 28. Also, in this valve position, the individual cylinder chambers of the length-adjustable elements 18, 20, 22, and 28 are mutually separated with respect to the four 4/4-way valves 46, 48, 50, 52.

The 4/4-way valve 46 is associated with the length-adjustable upper link bar 18, the 4/4-way valve 48 with the length-adjustable lifting element 20, the 4/4-way valve 50 with the length-adjustable lifting element 22, and the 4/4-way valve 52 with the length-adjustable transverse link element 28. If the first switch position from the left of a 4/4-way valve 46, 48, 50, or 52 is actuated, the piston of the corresponding cylinder is driven outward. The piston of a cylinder is retracted if the third switch position from the left of the corresponding 4/4-way valve 46, 48, 50, or 52 is actuated. If the fourth switch position from the left of a four 4/4-way valve 46, 48, 50, or 52 is actuated, the corresponding cylinder is switched to zero pressure (pressureless state).

In FIG. 3, two connecting lines 58, 60 are provided, whereby the chambers of the cylinders of the two lifting elements 20, 22 can be interconnected. Such interconnection of the cylinder chambers of the two lifting elements 20, 22 can effect, e.g., rotation of the implement around the longitudinal axis of the working vehicle. In the connecting lines a 6/2-way valve 62 is provided whereby an interconnection of the cylinder chambers of the two lifting elements 20, 22 can be established or interrupted. In the position of the 6/2-way valve 62 shown in FIG. 3, the piston-side and plunger-side chambers of the cylinders of the lifting elements 20, 22 are mutually separated; i.e. the connecting lines 58, 60 are interrupted. By means of the two connecting lines 58, 60 the cylinder chambers of the two lifting elements 20, 22 can be directly and passively interconnected; this can be brought about by bringing the 6/2-way valve 62 into its upper position. In this way the working vehicle can be particularly advantageously rotated around its longitudinal axis, with respect to the implement, without the need for active regulation of the angular position; the working vehicle can still receive supported loads of the implement.

FIG. 4 shows a variant of the hydraulic circuit (compared to FIG. 3) for control of the four length-adjustable elements 18, 20, 22, and 28. Analogous component parts here are labeled with like reference numerals. In addition to the two connecting lines 58, 60, two additional connecting lines 63, 64 are provided which enable interconnection of the cylinder chambers of the length-adjustable elements 18, 20, and 22. A 7/2-way valve 66 is associated with the connecting lines 58, 60, 63, and 64, wherewith in one position of valve 66 the interconnection of the individual cylinder chambers is interrupted. In the position of the 7/2-way valve 66 shown in FIG. 4, the piston-side chambers of the lifting elements 20, 22 and of the upper link bar 18 are interconnected, and the plunger-side (rod-side) chambers of the lifting elements 20, 22 and of the upper link bar 18 are connected to the sump 68. In this state, one can provide damping for the towed implement, as well as transfer of weight to the forward axle of the working vehicle. It is also conceivable to provide a connection of one or the other chamber of a cylinder of a length-adjustable element 18, 20, 22, and/or 28, to a pressure reservoir (not shown in FIGS. 3 and 4), via an additional valve and hydraulic line (both also not shown in FIGS. 3 and 4). An example of such an option is disclosed in PCT Pat. App. PCT/EP 03/04955 of the present Applicant; the disclosure in that Application is incorporated herein by reference. In this manner, the corresponding cylinders can dampen relative movements between the working vehicle and the implement, which advantageously improves driving comfort.

Figure 5:
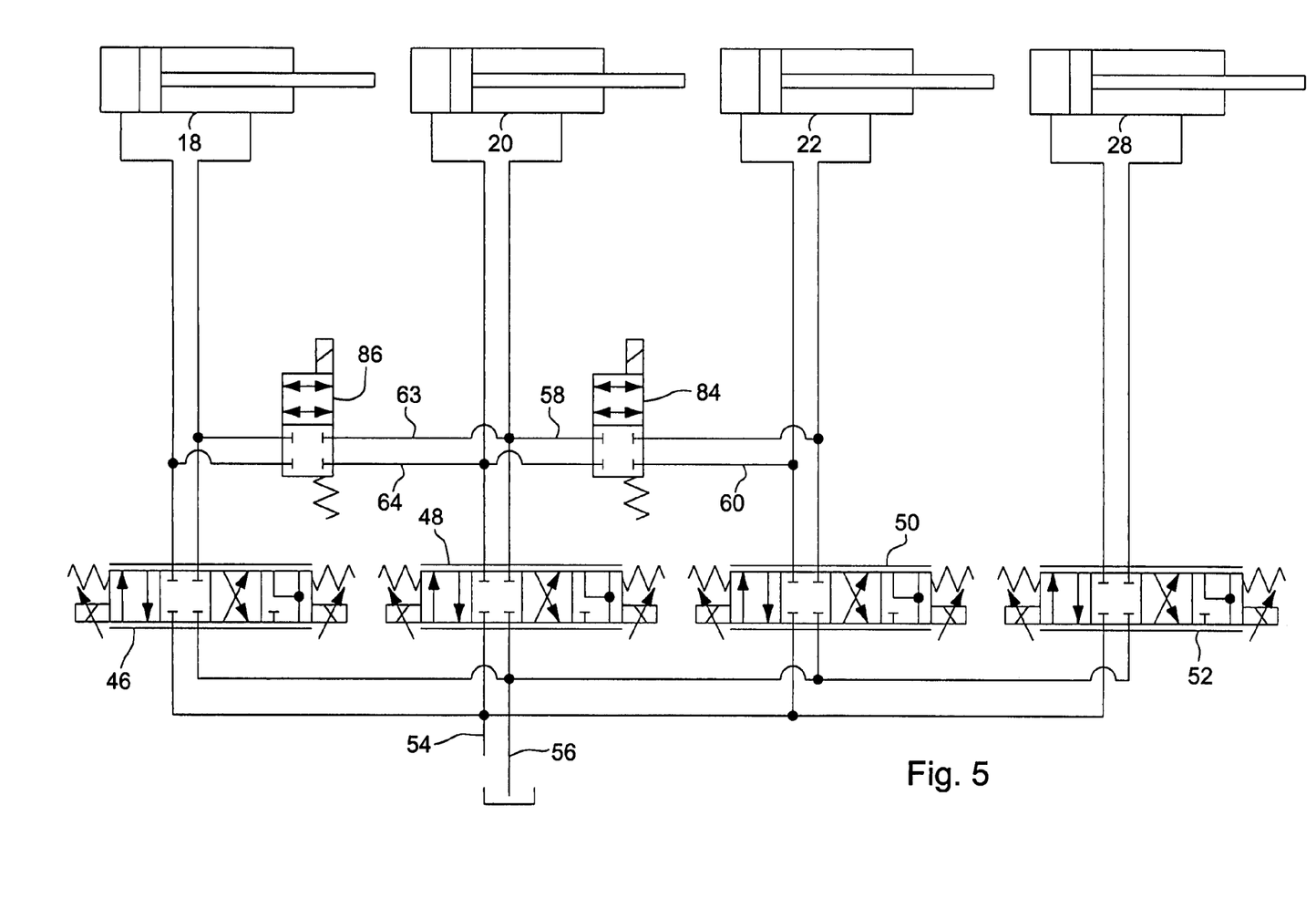
FIG. 5 is a schematic representation of a third exemplary embodiment of a hydraulic circuit for control of four length-adjustable elements of a coupling apparatus.

FIG. 5 shows a variant of the hydraulic circuit (compared to FIGS. 3 and 4) for control of the four length-adjustable elements 18, 20, 22, and 28. Here too, analogous component parts are labeled with like reference numerals. With this arrangement, the cylinder chambers of the two lifting elements 20, 22 can be interconnected (or separated) via the 4/2-way valve 84 and the two connecting lines 58, 60. In addition, the connecting lines 63, 64 to the upper link bar 18 can be connected (or interrupted) by means of the valve 86. Thus, according to the hydraulic circuit of FIG. 5 it is possible to interconnect only the two lifting elements 20, 22 without connecting the cylinder chambers of the upper link bar 18 with the two lifting elements 20, 22. If the two valves 84, 86 are brought into their lower positions, the cylinder chambers of the upper link bar 18 and of the two lifting elements 20, 22 are all interconnected.

Figure 6:
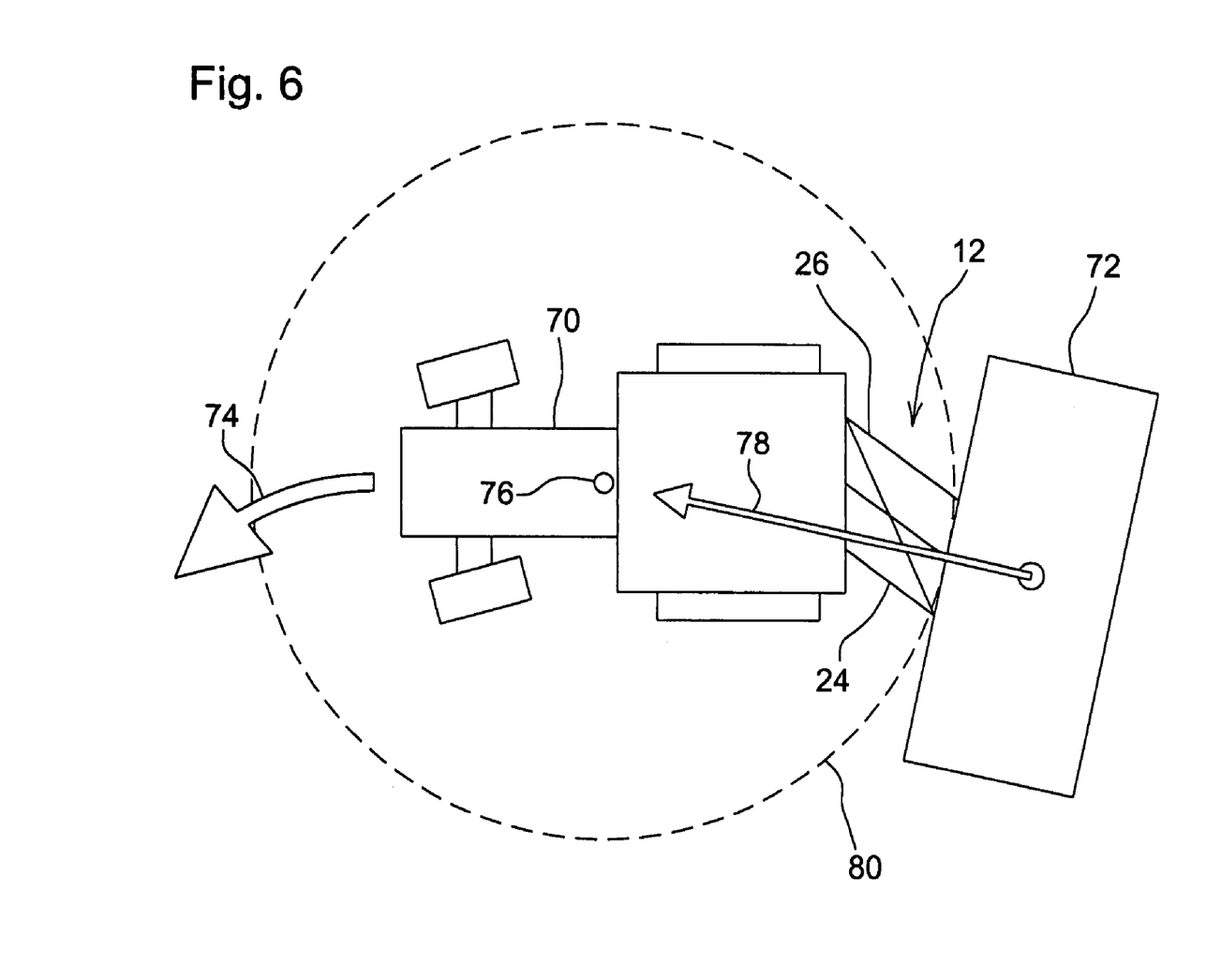
FIG. 6 is a schematic representation of an implement in a plan view, the implement being coupled to a working vehicle via a coupling apparatus, wherewith the working vehicle is being driven in a curved path.
Figure 7:
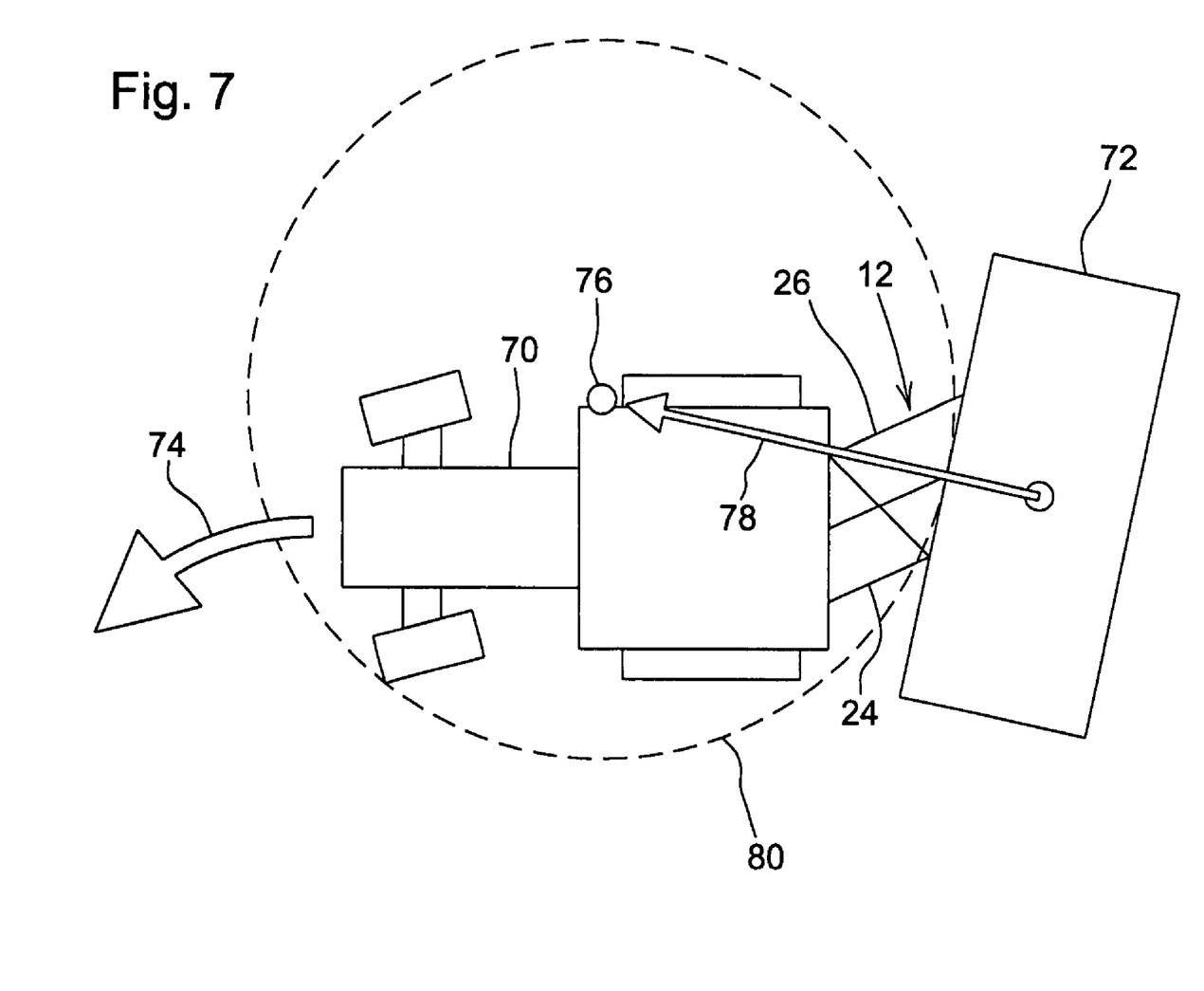
FIG. 7 is a second schematic representation of an implement in a plan view, the implement being coupled to a working vehicle via a coupling apparatus, wherewith the working vehicle is being driven in a curved path.

In FIGS. 6 and 7, a tractor-trailer combination comprised of a tractor 70 and an implement 72 is shown traveling in a curved driving path. The direction of travel is indicated by the arrow 74. The two lower link bars 24, 26 of the coupling apparatus 12 are illustrated as being length-adjustable in FIGS. 6 to 9, with the capability of being hydraulically controlled.

In FIG. 6, the coupling apparatus 12 is controlled such that the weight of the towed implement 72 on the tractor 70 is effective at the effective towing point 76, as indicated by the arrow 78. In FIG. 7 the coupling apparatus 12 is controlled such that the weight of the towed implement 72 on the tractor 70 is effective at the effective towing point 76, which in this case is laterally displaced with respect to the longitudinal axis of the tractor. The force direction is again indicated by the arrow 78. The driving characteristics of the tractor-trailer combination, particularly the force transmission between the tractor and the implement when traveling in a curved path, can be improved by shifting of the effective towing point 76. It is possible to assist the tractor in the execution of a curved path; or, as illustrated in FIG. 7, the curved path can be counteracted by a counter-moment to the turning moment.

Figure 8:
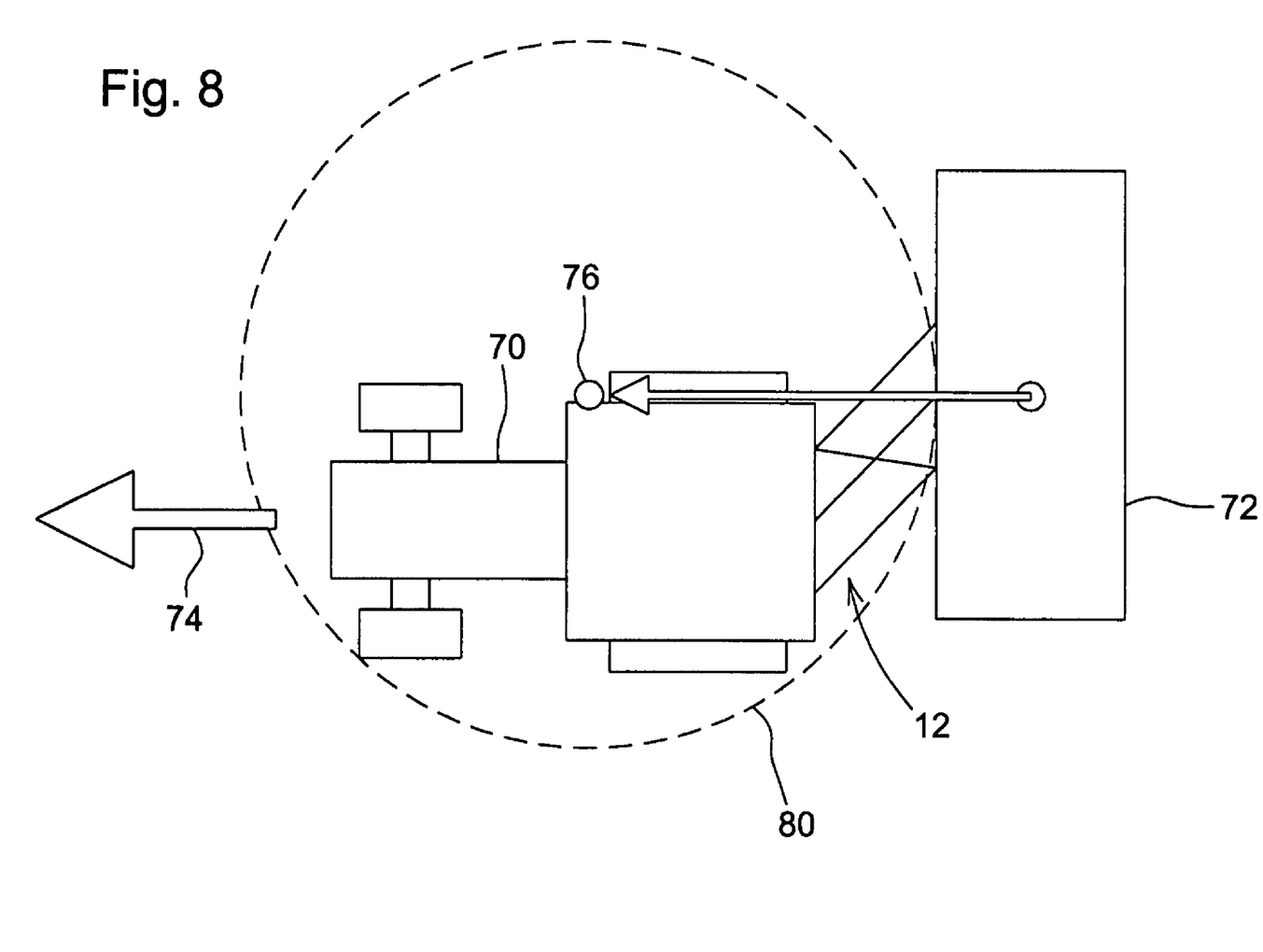
FIG. 8 is a third schematic representation of an implement in a plan view, the implement being coupled to a working vehicle via a coupling apparatus, wherewith the implement is laterally displaced with respect to the working vehicle; and, FIG. 9 is a schematic representation of a implement in a lateral view, the implement being coupled to a working vehicle via a coupling apparatus.

In FIG. 8, in a schematic representation, a tractor-trailer combination comprised of a tractor 70 and an implement 72 is shown traveling in a straight ahead path. Here the coupling apparatus 12 is controlled such that the implement 72 is laterally displaced with respect to the tractor 70, relative to the direction of travel 74 i.e. laterally displaced with respect to the longitudinal axis of the tractor, and is being towed freely swingably around the effective towing point 76. Such an operating mode is particularly advantageous for implements which need a swingable connection and which advantageously are driven at an offset to the path of the tractor.

In FIGS. 6 to 9, the circle 80 is shown in dashed lines; this circle represents the circle of swingability of the coupling apparatus 12 (and thus of the implement 72) achievable by adjusting the individual lengths of the length-adjustable elements 18, 20, 22, 24, 26, and 28. The center of the circle 80 corresponds to the effective towing point 76.

Figure 9:
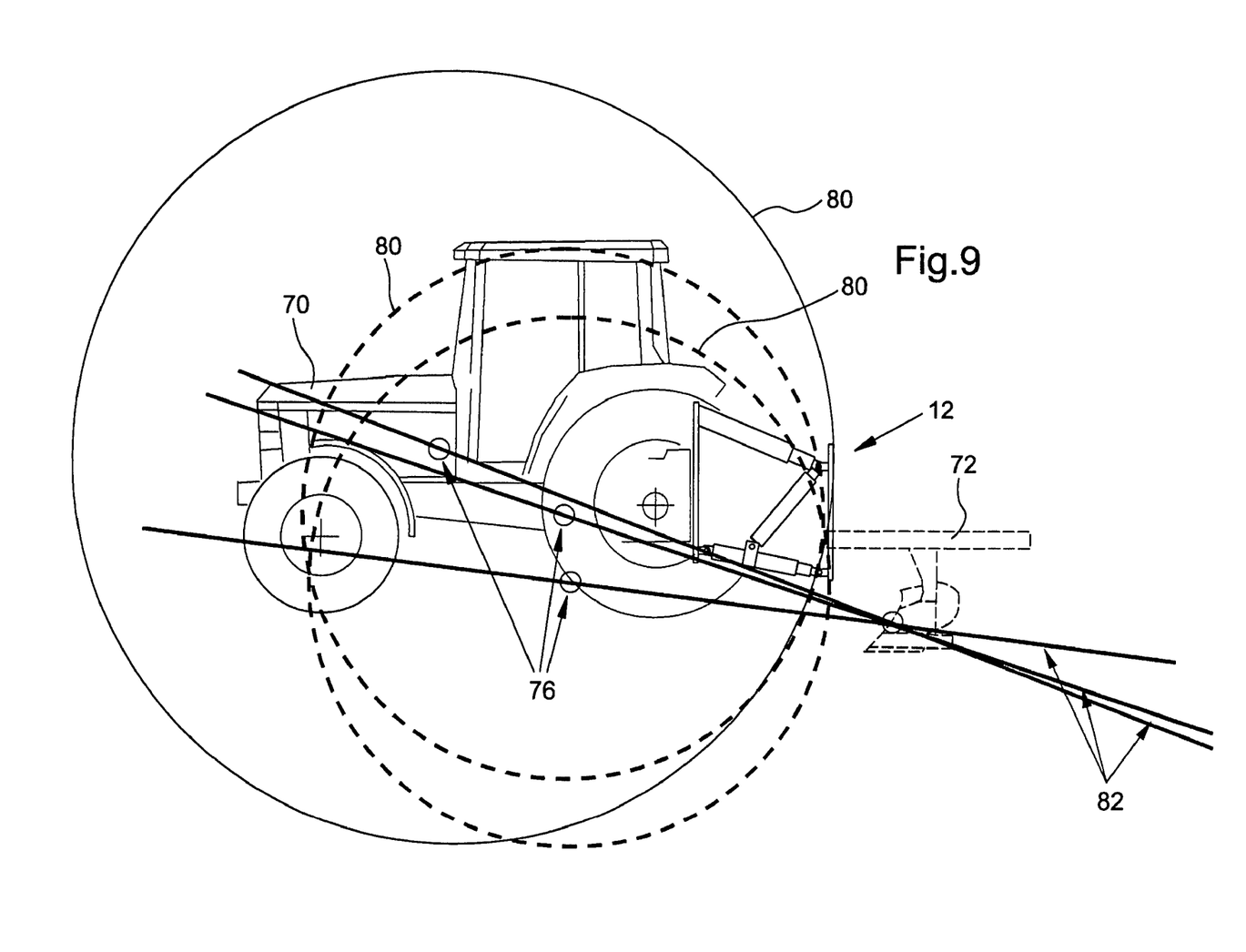

FIG. 9 is a schematic representation, in a lateral view, of a tractor 70 to which an implement 72 in the form of a plow has been attached via the coupling apparatus 12. By appropriate control of the length-adjustable elements 18, 20, 22, 24, 26, and 28 of the coupling apparatus 12, the circular path on which the implement is vertically swingable can be changed. In this manner, the vertical position of the effective towing point 76 on the tractor 70 can be changed relative to the tractor 70. In addition, the position of the effective towing point 76 along the longitudinal axis of the tractor 70 can be shifted (as illustrated by the leftward most and upward most effective towing point 76 shown). The straight lines labeled with reference numeral 82 represent the effective lines of action of the resulting plowing force, as applied to the tractor 70. The plow coupled to the tractor 70 by the coupling apparatus 12 can have its depth adjusted by means of the coupling apparatus 12, even though it is being pulled in freely swingable fashion.

It is especially advantageous that the coupling apparatus 12 can transfer the weight of the implement 72 to the tractor 70 without raising the operating position (so-called "floating position") of the implement. Thereby it is also possible via operation of the coupling apparatus 12, for the implement 72 and the tractor 70 to be rotated with respect to each other around the longitudinal axis of the tractor. Further it is fundamentally not necessary to have convergence of the lower link bars and the upper link bar in order to generate an intersection point through which the effective line of the resultant passes.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. An apparatus for coupling an implement to a working vehicle, comprised of a coupling frame adapted to provide three point coupling functionality for an implement, two lower link bars, a length-adjustable upper link bar, and two lifting elements, wherewith an end closest to the working vehicle, of each of the lower link bars and the upper link bar, is swingably mountable, and an end closest to the implement is likewise swingably mounted to the coupling frame, wherewith the upper link bar is essentially disposed centrally in an upper region of the coupling apparatus, the two lower link bars are disposed essentially laterally in a lower region of the coupling apparatus, and one end of each of the lifting elements being swingably mounted in a central region of a respective lower link bar; wherein respective other ends of the lifting elements, directed toward the implement, are swingably mounted in an upper region of the coupling frame on the implement side.

2. An apparatus according to claim 1 wherein on the side directed toward the implement the lifting elements are mounted via a lever arm construction which preferably comprises length-adjustable lifting cylinders.

3. An apparatus according to claim 1 wherein the lifting elements are configured so as to be length-adjustable.

4. An apparatus according to claim 1 wherein on a side directed toward the implement, a coupling frame is provided, on which the lower link bars, the upper link bar, and the lifting elements are mountable.

5. An apparatus according to claim 4 wherein the coupling frame has an adapter interface for an implement, which interface comprises coupling means for attaching the implement.

6. An apparatus according to claim 1 wherein, on the side directed toward the working vehicle, the lower link bars and the upper link bar are directly mounted on a housing of the working vehicle or on a frame structure disposed on the working vehicle, which frame structure is removable.

7. An apparatus according to claim 6 wherein, on a side directed toward the working vehicle, the lower link bars are mounted close to a vehicle axle.

8. An apparatus according to claim 1 wherein the upper link bar and the lifting elements are controllable such that the distribution of weight of the working vehicle and of weight transmitted from the implement acting on the working vehicle, can be varied.

9. An apparatus according to claim 8 wherein a load which acts vertically on the working vehicle, can be distributed uniformly or in a prescribable ratio, on the axles of the working vehicle.

10. An apparatus according to claim 1 wherein the lower link bars are configured so as to be length-adjustable.

11. An apparatus according to claim 3 wherein a length-adjustable transverse link element is provided which cooperates with at least one of the two lower link bars.

12. An apparatus according to claim 11 wherein one end of the transverse link element is swingably mounted to one lower link bar, and the other end of the transverse link element is swingably mounted to the other lower link bar or is swingably mounted with respect to the working vehicle.

13. An apparatus according to claim 1 wherein a length-adjustable transverse link element is provided, one end of which is swingably mounted with respect to the implement and another end of which is swingably mounted to one of the two lower link bars or is swingably mounted with respect to the working vehicle.

14. An apparatus according to claim 13 wherein the transverse link element and the two lower link bars are disposed such that a closed kinematic chain is formed by the three elements.

15. An apparatus according to claim 11 wherein an end of the transverse link element swingably mounted to the lower link bar is co-located with an end of a lifting element which is swingably mounted to the lower link bar.

16. An apparatus according to claim 1 wherein the two lower link bars and/or the lifting elements are arranged mutually in a parallel disposition or a convergent disposition or in a V-configuration.

17. An apparatus according to claim 1 wherein a length-adjustable element has at least one of a travel measurement system, a pressure sensor, and/or a force sensor.

18. An apparatus according to claim 1 wherein at least one end of a lower link bar, an upper link bar, a lifting element, and/or a transverse link element has a pivotable coupling whereby relative movement in at least two degrees of freedom is possible.

19. An apparatus according to claim 11 wherein the two lower link bars are length-adjustable; and the length-adjustable lower link bars, the length-adjustable lifting elements, the length-adjustable upper link bar, and/or the length-adjustable transverse link element are controlled in such a manner that a spatial position, relative to the working vehicle, of an effective towing point of the implement, can be changed.

20. An apparatus according to claim 19 wherein by controlling at least one length-adjustable element, such that the implement is freely swingable in the vertical and/or horizontal plane, around the effective towing point, on a circular path which path is variable by controlling the length-adjustable elements, the spatial position of the effective towing point in an essentially vertical and/or horizontal direction of shift can be changed.

21. An apparatus according to claim 20 wherein a "floating position" and/or a swinging movement, between the working vehicle and the implement is achievable by switching into a pressureless state at least one of the length-adjustable elements.

22. An apparatus according to claim 21 wherein by means of switching into a pressureless state the length-adjustable transverse link element, a swinging movement between the working vehicle and the implement is achievable.

23. An apparatus according to claim 21 wherein by means of switching into a pressureless state the length-adjustable upper link bar, a "tipping" between the working vehicle and the implement is achievable.

24. An apparatus according to claim 21 wherein by means of switching into a pressureless state and/or connection of hydraulic chambers of the elements which serve to execute lifting movements, the bearing of supported loads and/or a rotation around the longitudinal axis of the working vehicle is achievable.

25. An apparatus according to claim 1 wherein by active control of individual length-adjustable elements, an adjustable relative positioning between the working vehicle and the implement is achievable, which positioning is adjusted to the given operating mode of the working vehicle and implement, which relative positioning is preferably a height regulation of an implement.

* * * * *